2,915,792

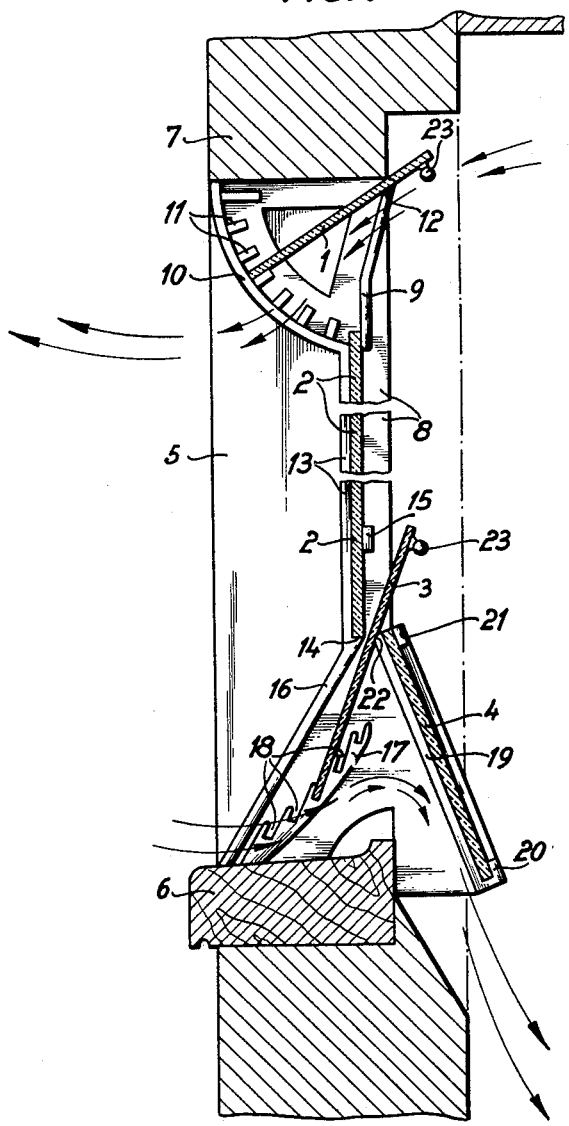

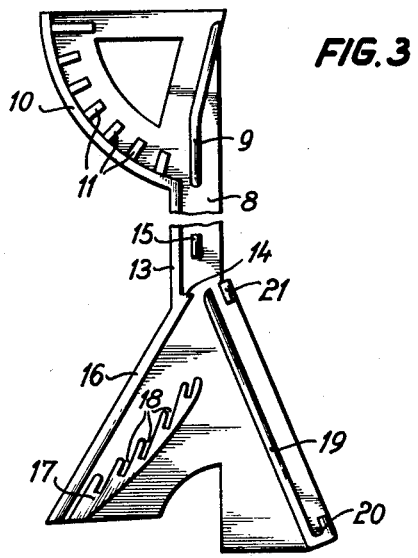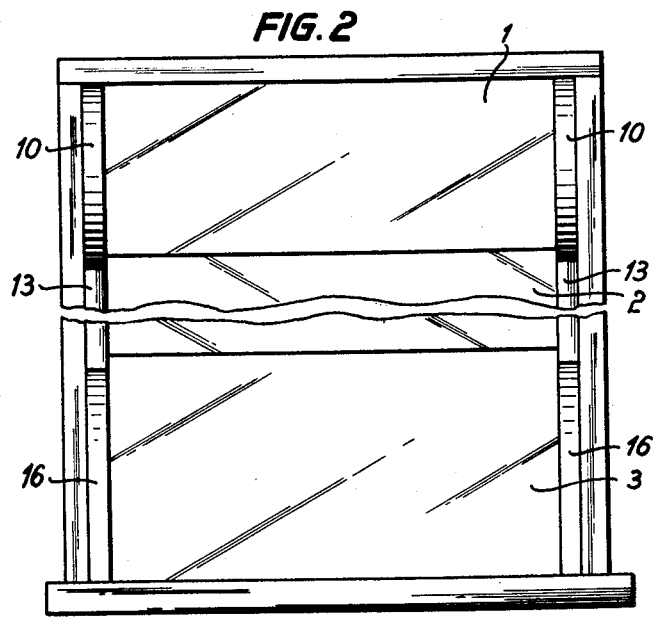

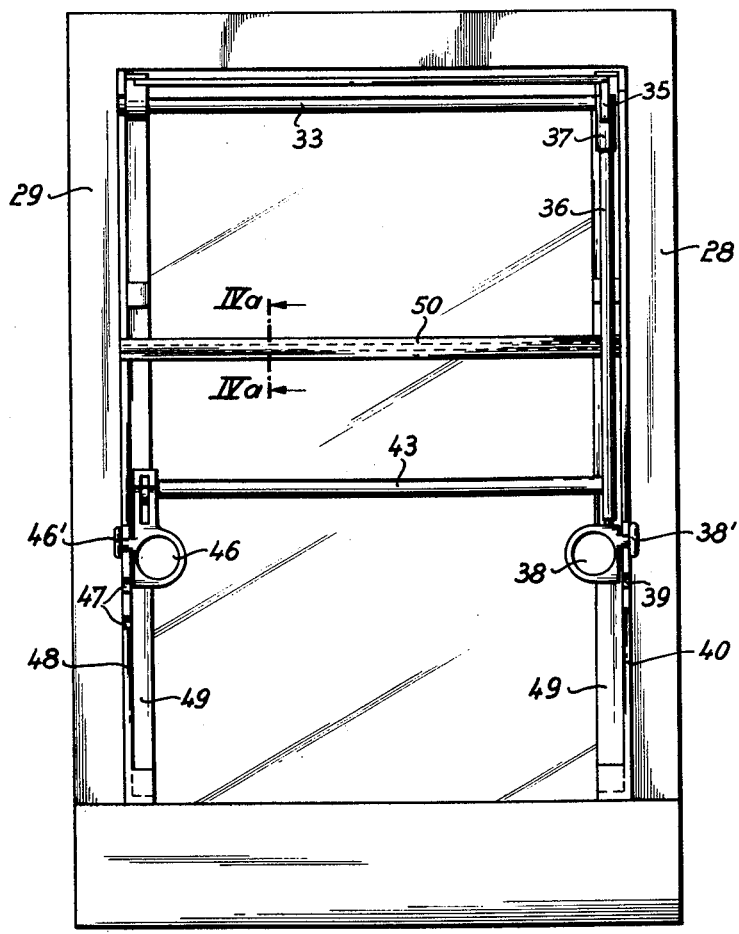

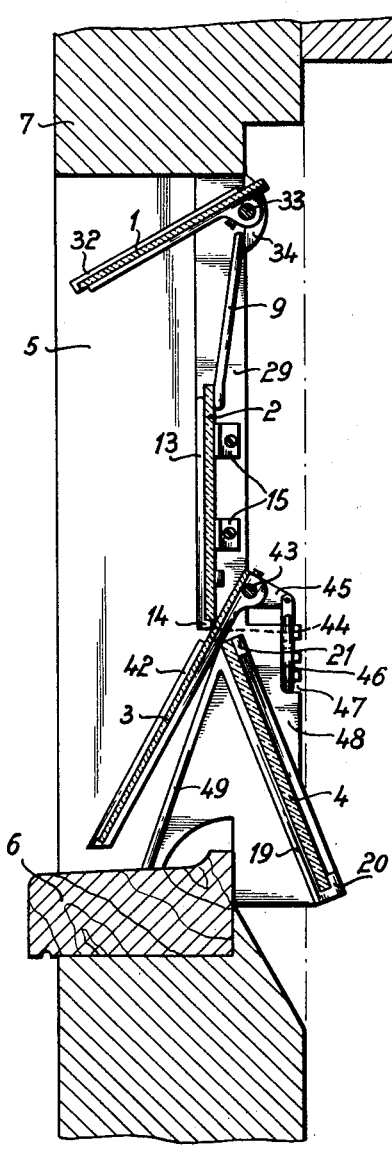

DEVICE FOR SUPPLY AND REMOVAL OF AIR

Josef Künzli, Jestetten, Baden, Germany

Application December 31, 1958, Serial No. 784,277

Claims priority, application Germany January 7, 1958

15 Claims. (Cl. 20—42)

The invention relates to a device for the supply of fresh air to and removal of stale air from enclosed spaces, particularly industrial buildings, storage buildings, stables and similar structures.

The object of the invention is an effective exchange of spent warm air against clean and cool air from the atmosphere.

Another object of the present invention is to effect that exchange without the creation of turbulence and drafts.

A further object of the invention is the regulation of the incoming and outgoing air in a simple manner, adapted for all practical requirements.

Moreover, the invention is designed to create a device which is easily built, easy to install and which will fit any size window.

The present invention now will be further explained with reference to the accompanying drawings. However, it should be understood that these serve merely as illustration, not as limitation, and that numerous changes may be made in the details without departing from the spirit and the scope of the invention.

In the drawings,

Fig. 1 is a longitudinal section through a window carrying the device according to the present invention;

Fig. 2 is a frontal view of the window with the device according to the invention;

Fig. 3 is a plan view of a side plate for the device;

Fig. 4 is a frontal view of a window equipped with a different embodiment of the present invention;

Fig. 4a shows the H section of the bar 50;

Fig. 5 is a longitudinal view of the window shown in Fig. 4;

Fig. 6 is a view similar to that shown in Fig. 5 looking in the direction of the right side post of the window.

Referring to Figs. 1–3, the window shown therein has an upper pane 1, a center pane 2, a lower pane 3, and an inner guided pane 4. The latter may be opaque and may consist of a material other than glass, e.g., a plastic. These panes are held in place by equal mirror-inverted side plates 8, which are fastened to the two side posts 5 of the window frame and extend from the window sill 6 to the upper wall 7. The plates 8 have a rearward bar 9, partially canting toward the upper rear, and a frontal bar 10 which has the shape of a quarter-circle and is provided with radial protuberances 11. The upper pane 1 is inserted in a slit between the upper end 12 of bar 9 and the wall 7. Pane 1 thereby rests, on one side, on the upper end 12 of bar 9, and, on the other side, on one of the radial protuberances 11 and the quarter-circle bar 10. As desired, the angle of inclination of pane 1 can be changed by partial withdrawal, turning it around end 12 and resting it on the protuberance 11 which has the desired angle.

To the lower part of quarter-circle bar 10, a vertical bar 13 is connected which has a lower stud 14, directed toward the rear. Behind bar 13 a fastener 15 is disposed which may consist, e.g., of an angle which is screwed on.

The center pane 2 is wedged between the vertical bar 13 and the fastener 15; its lower part rests on stud 14.

The vertical bar 13 continues downward in a bar 16 which is inclined toward the lower front. At the lower end of the side plates 8, an inclined bar 17 is disposed, which is slightly curved and extends rearward and which also is provided with step-like notches 18. Behind bar 17, a bar 19, inclining down and rearward and provided with a pocket 20, and a fastener 21, similar to fastener 15, are disposed.

The lower pane 3 can be inserted in the slit between bars 19 and the stud 14 of bar 13. The pane 3 can be turned around the upper end 22 of bar 19 and can be set in one of the notches 18 in bar 17, the notch to be selected according to the desired angle of inclination.

The guided pane 4 is wedged tightly between bar 19 and fastener 21, similarly to the center pane 2. The lower part of pane 4 rests in pocket 20 of bar 19.

In order to facilitate turning of the panes 1 and 3, they are provided with a plastic knob 23.

The above-described embodiment of the air supply device has numerous advantages. As indicated by the arrows in the drawings, the upper stream for air removal and the lower one for fresh air supply are separated entirely from each other and cannot possibly mix. The upper air removal stream starts from the highest possible layer of air so that sufficiently intense removal of stale air is assured even at a small angle of inclination of upper pane 1. The supply of fresh air is accomplished at the lowest possible point so that sufficient air supply is assured. Because the guided pane 4 extends below the window sill and inclines downwards and rearwards, the fresh air supply likewise is directed downward thereby ensuring a draft-free fresh air supply. Since both panes can be adjusted independently from each other up to total closing, air supply and removal may easily be adapted to all possible conditions.

Above all, an adaption of the device to any window size is feasible. The side plates 8 can be subdivided. If the window opening is smaller than corresponds to the normal length of side plates 8, only the center parts of the side plates carrying the vertical bars 13 need be shortened. If the window openings are higher than side plates 8, all that is required is the insertion of suitable center parts with bars 13.

It also is of importance that the fasteners are very narrow so that, at a given size of the window openings, the most possible entry of light is effected. It should also be pointed out that, due to the inclination of panes 1 and 3, rain water always is deflected outwardly, and that the lower pane 3, protruding inwardly beyond the lower end of pane 2, conducts condensed moisture to the outside, also.

Moreover, the device according to the present invention permits the installation of bars in front of the window, e.g., for protection against burglaries, because such bars may be set in the walls in front of the center pane 2 and even at one-half the height of the adjustable panes 1 and 3 without interfering with the adjustment of these panes.

The embodiment shown in Figs. 4–6 largely corresponds to that of Figs. 1–3. Like parts are shown by the same numbers.

However, in the case of the window according to Figs. 1–3, the panes 1 and 3 must be pulled out by hand in order to change the angle of inclination and inserted in the desired protuberance 11 of bar 10 or in the corresponding notch 18 of bar 17, respectively. In the embodiment according to Figs. 4–6, the adjustment of panes 1 and 3 is facilitated, the panes are set more securely and are protected from breakage and from vibration.

In this embodiment, pane 1 is inserted in the notches of two U-shaped rocking levers 31, 32 which are connected to each other by a tube 33 onto which they are screwed. This tube 33 may preferably consist of a light metal. Tube 33 rests pivotably in shafts (not visible) of rearward lugs 34 of the side parts 28, 29. The right rocking lever 31 has an extension 35 on which an actuating rod 36 is suspended, e.g., by means of a link joint 37. The latter is provided with a ring-shaped handle 38 which has a T-shaped projection 38'. By means of this projection 38', handle 38 can be inserted in the different notches 39 of a rearward shoulder 40 of the right side plate 28 in order to secure the upper pane 1 in the desired angle of inclination.

The lower pane 3 is inserted in the notches of two substantially U-shaped rocking levers 41, 42 which likewise are connected to each other by a tube 43, preferably consisting of light metal. The two rocking levers 41, 42 have bolt attachments 44 directed to the side plates 28, 29 which protrude into the boreholes of side plates 28, 29 (not visible) and thus permit pivoting of the levers 41, 42 and of pane 3.

The left rocking lever 42 has an extension 45 provided with a ring-shaped handle having a T-shaped projection 46'. By means of that projection the handle 46 can be inserted into the different notches 47 of a rearward protuberance 48 of the left side plate 29 so that the lower pane also may be secured in different angles of inclination. As lower stops for the rocking levers 41, 42 serve inclined bars 49, directed rearward and downward and attached to bars 19, forming a V therewith.

The embodiment described has the same advantages with regard to the direction of the air stream and to the prevention of rain and condensed water from entering through the window as the one described earlier. Moreover, the adjustment of the panes 1 and 3 is rendered more convenient and easy. Furthermore, these panes rest quite securely in the rocking levers 31, 32 and 41, 42, respectively, yet are easily removed. Also, elastic gaskets may be inserted in the notches of these levers with the panes, thereby preventing vibration and simultaneously sealing the window.

In both embodiments described, the center pane can be left out, and the part of the side plates serving to hold the same may be omitted. To avoid loss of material, the side plates can be made from three or four parts which are applied as needed. When, as used to a large extent lately, very high windows are employed, the center panes may be subdivided, and dual U-shaped bars 50 (Fig. 4) installed in order to save expenses in case of breakage of the panes. These bars are also shown in Fig. 4a.

It is desirable to manufacture the holding devices, bars and plates from a corrosion-resistant material, preferably from light metal. It also is advantageous to cast these parts as integral units.

I claim:

1. A device for the suply of fresh air to, and removal of spent air from, enclosed rooms having window space, comprising an upper and a lower pane, both adjustably inclined outward and downward; at least one center pane immovably disposed between said upper and lower pane; an adjustable inward and downward inclined guided pane; all of said panes being held by a fastener disposed on both sides of said window space; said fastener consisting of at least one holding plate provided with a plurality of bars adapted to hold said center pane in rigid position and said upper and lower pane in adjustable position.

2. The device according to claim 1, wherein said upper pane pivots around the upper edge of a vertical bar, inclined rearward and upward, and is arrested at the desired angle of inclination.

3. The device according to claim 2, wherein said upper pane is inserted removably and rests on one of a plurality of radial notches of a frontal bar of substantially quarter-circular shape.

4. The device according to claim 2, wherein said upper pane is inserted in two rocking levers fastened pivotably to each side of the window space by means of holding plates, both of said rocking levers being adjustable simultaneously by means of a single handle to the desired angle of inclination.

5. The device according to claim 1, wherein said lower pane pivots around the upper edge of a bar inclined rearward and downward and is arrested at the desired angle of inclination.

6. The device according to claim 5, wherein said lower pane is inserted removably and rests in one of a plurality of notches of a bar inclined rearward and upward.

7. The device according to claim 5, wherein said lower pane is inserted in two rocking levers fastened pivotably to each side of the window space, both of said rocking levers being adjustable simultaneously by means of a single handle to the desired angle of inclination.

8. The device according to claim 1, wherein said center pane is inserted in and held in place between the lower end of a bar serving simultaneously as fastener of the upper pane, at least one rearward fastener, and a frontal bar provided with a stud.

9. The device according to claim 8, wherein said center pane is held by plates which can be lengthened and shortened in order to adapt the device to the size of the window space.

10. The device according to claim 1, wherein said guided pane is held by a bar inclined rearward and downward and provided, at its lower end, with a pocket and by at least one fastener.

11. The device according to claim 1, wherein said guided pane is made of a plastic.

12. The device according to claim 1, wherein said guided pane protrudes rearward below the lower edge of said window space.

13. The device according to claim 1, wherein said lower pane protrudes rearward above the lower edge of said center pane.

14. The device according to claim 1, wherein the holding plates and bars consist of a non-corrosive material.

15. The device according to claim 14, wherein the holding plates and bars consist of a light metal and are cast as integral units.

References Cited in the file of this patent

UNITED STATES PATENTS

| | | |
|---|---|---|
| 499,008 | Brudon | June 6, 1893 |
| 2,125,669 | Fisk | Aug. 2, 1938 |